INVENTOR.
JAIME UDELMAN,
BY
Berman, Davidson & Berman
ATTORNEYS.

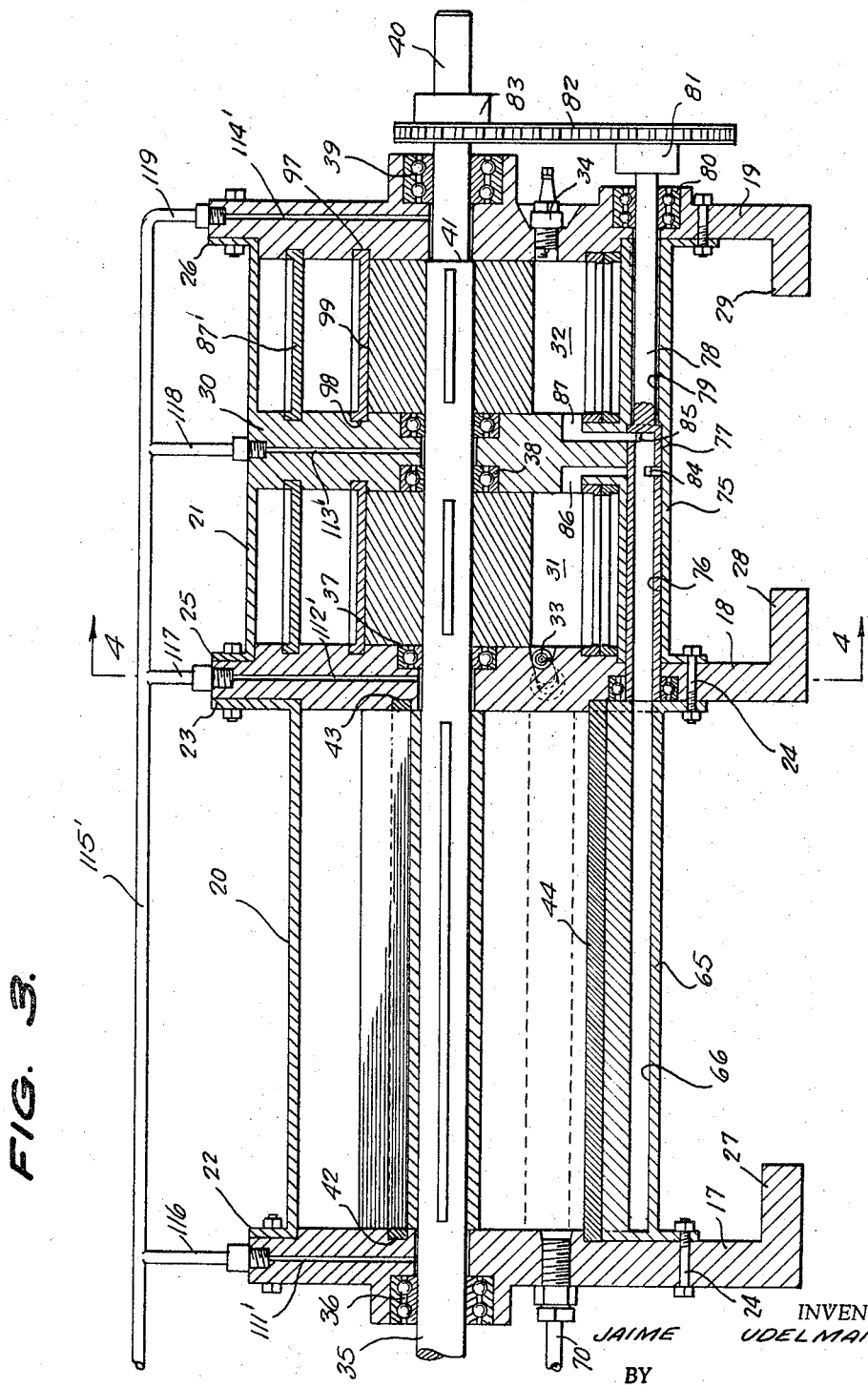

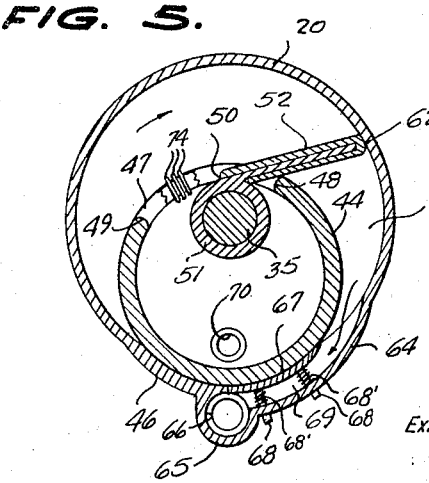

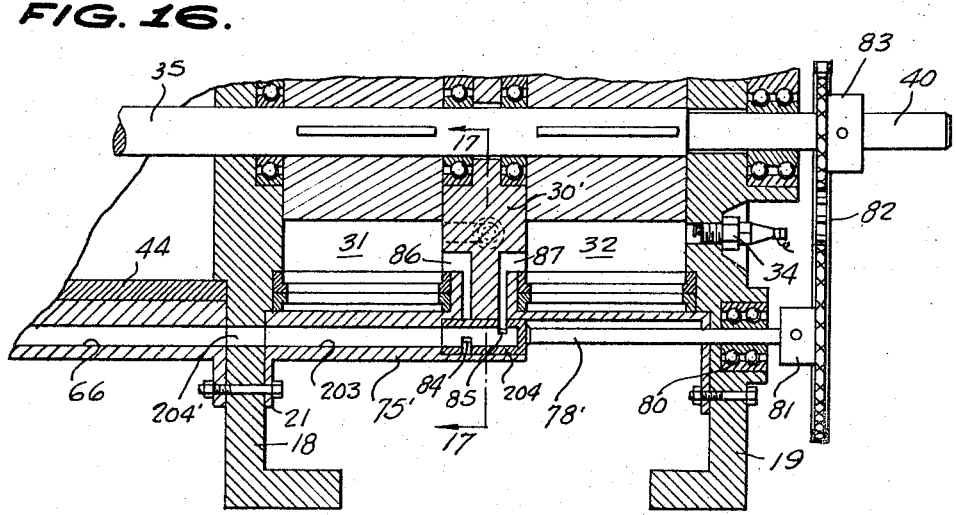
FIG. 16.
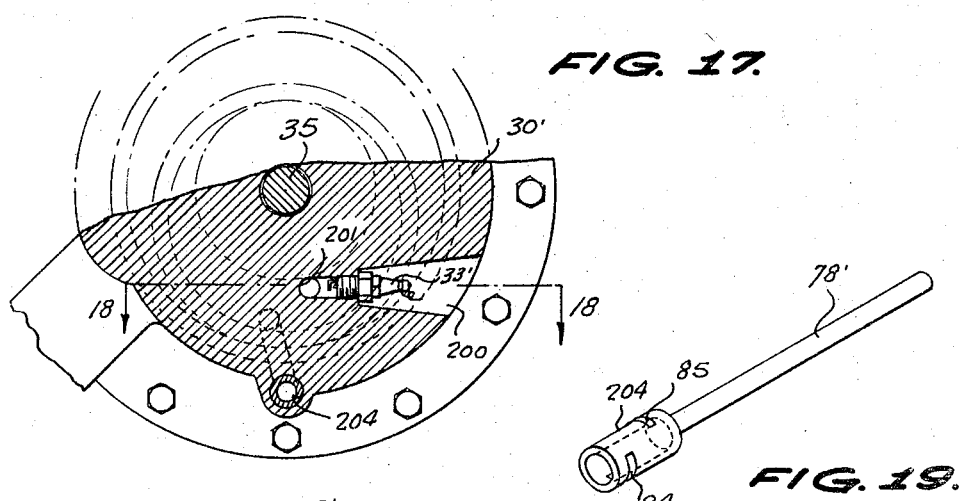
FIG. 17.
FIG. 19.
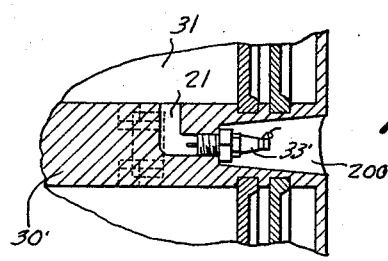
FIG. 18.

United States Patent Office 3,312,202
Patented Apr. 4, 1967

3,312,202
ROTARY INTERNAL COMBUSTION ENGINE COOLED BY COMPRESSED AIR
Jaime Udelman, Ave. M. Felipe Tovar, Edificio Hena, Apt. 3, San Bernardino, Caracas, Venezuela
Filed July 28, 1964, Ser. No. 385,653
12 Claims. (Cl. 123—16)

This invention relates to rotary internal combustion engines, and more particularly to a rotary internal combustion engine of the type including a compressor assembly for compressing fuel which is subsequently supplied to the combustion chambers of the engine.

A main object of the invention is to provide a novel and improved pistonless internal combustion engine wherein the moving parts are continuously rotatable in the same direction and through which the fuel mixture and combustion gases flow in a substantially constant direction, the engine being provided with separate portions for compressing and burning the fuel mixture, the moving parts of said separate portions being rotated in unison in accordance with the cyclic operation of the engine, the engine being relatively simple in construction, being smooth in operation, and being arranged so that there is minimum leakage of air or gases past moving parts of the engine during its operation.

A further object of the invention is to provide an improved pistonless rotary internal combustion engine having separate compression and combustion portions, the engine being relatively inexpensive to fabricate, being durable in construction, which provides a large expansion of combustion gases, as compared with the expansion obtained in engines of the reciprocating piston type, which provides quick and positive valve action between successive cycles of engine operation, which provides for high turbulence in the combustion chambers at the time of ignition of the combustible mixtures therein, and for scavenging of the combustion chambers immediately before intake, and which is provided with means for the thorough lubrication of all bearing surfaces.

A still further object of the invention is to provide an improved pistonless rotary internal combustion engine of the type employing an air blower which supplies cooling air through the interior of the engine, filling up all the volume and spaces therein constantly and uninterruptedly, the cooling air penetrating into the combustion cylinders and assisting in expelling the spent gases therefrom as well as cooling the interior thereof, the engine being provided with two adjacent combustion cylinders which operate alternately, the combustion cylinders being alternately exposed to intense cooling by the compressed air flow, whereby the operation of the engine has a high degree of smoothness and so the engine operates with maximum efficiency.

Further objects and advantages of the invention will become apparent from the following description and claims, and from the accompanying drawings, wherein:

FIGURE 3 is a longitudinal vertical cross sectional view taken substantially on the line 3—3 of FIGURE 2.

FIGURE 5 is a transverse vertical cross sectional view taken substantially on the line 5—5 of FIGURE 1.

FIGURE 6 is a transverse vertical cross sectional view taken on the line 6—6 of FIGURE 1.

FIGURE 7 is a transverse vertical cross sectional view similar to FIGURE 5, but showing a different stage of operation of the engine.

FIGURE 8 is a transverse vertical cross sectional view similar to FIGURE 6, but showing the engine in a stage of operation corresponding to that of FIGURE 7.

FIGURE 9 is a transverse vertical cross sectional view, similar to FIGURES 5 and 7, but showing the engine in a still further stage of operation.

FIGURE 10 is a transverse vertical cross sectional view, similar to FIGURES 6 and 8, but showing the engine in the stage of operation corresponding to that of FIGURE 9.

FIGURE 14 is a perspective view, partly broken away, of the rotary piston member employed in the fuel mixture compression section of the internal combustion engine of FIGURE 1.

FIGURE 15 is an enlarged fragmentary cross sectional view taken substantially on the line 15—15 of FIGURE 14.

FIGURE 16 is a fragmentary longitudinal vertical cross sectional view of a preferred modification of an improved internal combustion engine constructed in accordance with the present invention.

FIGURE 17 is a transverse vertical cross sectional view taken on line 17—17 of FIGURE 16.

FIGURE 18 is a horizontal cross sectional detail view taken on line 18—18 of FIGURE 17.

FIGURE 19 is a perspective view of the rotary sleeve valve employed in the modified engine of FIGURES 16 to 18.

Figure 1:
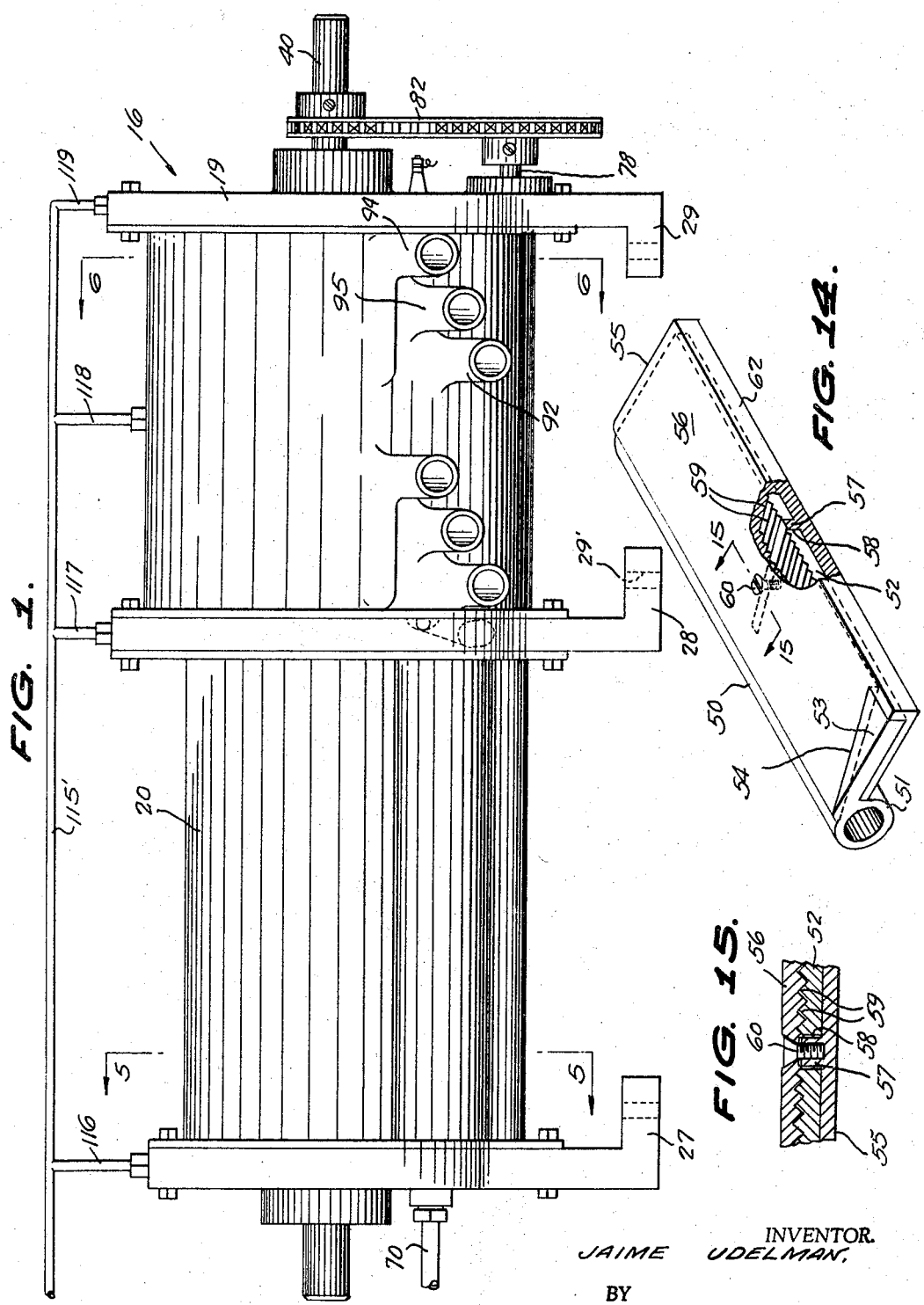
FIGURE 1 is a side elevational view of an improved rotary pistonless internal combustion engine constructed in accordance with the present invention.

Referring to the drawings, 16 generally designates an improved rotary internal combustion engine constructed in accordance with the present invention. The engine 16 comprises the transversely extending spaced rigid wall sections 17, 18 and 19, the wall sections 17 and 18 being connected by an intervening, generally cylindrical housing segment 20 and the wall sections 18 and 19 being connected by a generally cylindrical housing segment 21, the housing segment 20 being substantially longer than the housing segment 21. Housing segment 20 is provided with the outwardly extending end flanges 22 and 23 which are respectively secured to the transversely extending wall members 17 and 18, as by bolts 24. The housing 21 is similarly provided with opposite outwardly extending end flanges 25 and 26, secured in a similar manner to the transverse wall members 18 and 19, the bolts 24 employed to secure the flange 23 also passing through the flange 25 and securing same to wall member 18, as shown in FIGURE 3.

Figure 4:
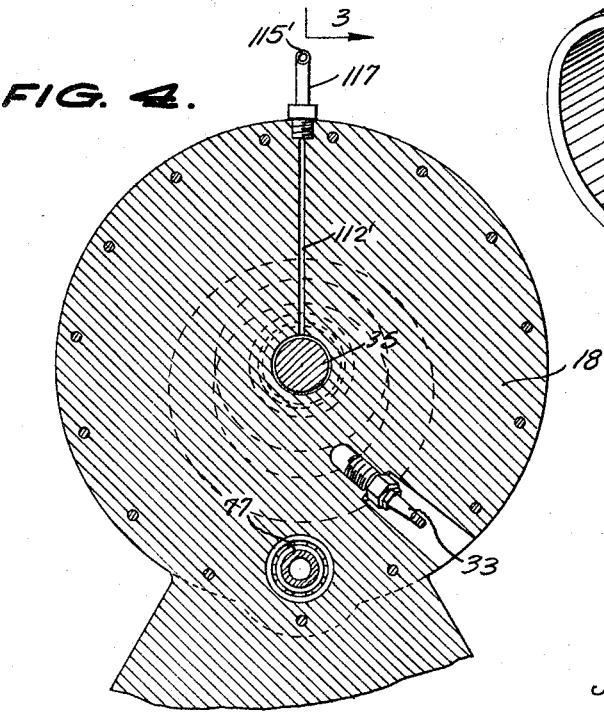
FIGURE 4 is a transverse vertical cross sectional view taken substantially on the line 4—4 of FIGURE 3.
Figure 12:
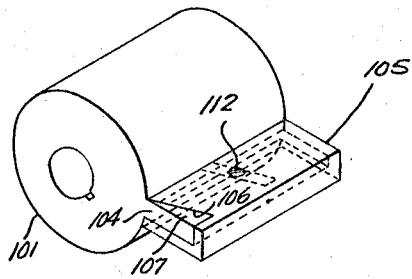
FIGURE 12 is a perspective view of a rotary piston member employed in a combustion cylinder of the engine in cooperation with the rotary compressor sleeve member of FIGURE 11.

The wall members 17, 18 and 19 are provided with respective horizontally extending base flanges 27, 28 and 29 which are employed as anchoring supports for the engine 16 and which are provided with bolt holes 29' to receive anchoring bolts. The housing segment 21 is integrally formed with a transversely extending intermediate wall member 30 which divides the housing member 21 into two similar combustion chambers which are oppositely phased and which work in alternating sequence, as will be presently explained, said chambers being shown respectively at 31 and 32 in FIGURE 3. The chamber 31 is provided with an ignition plug 33, mounted in the wall member 18 in the manner illustrated in FIGURE 4, the electrodes of the plug being exposed to the interior space of chamber 31, and the ignition chamber 32 is provided with an ignition plug 34, mounted in the end wall member 19, as shown in FIGURE 3, the electrodes thereof being exposed to the interior space of the combustion chamber 32.

Designated at 35 is the main shaft of the engine, said shaft being rotatably mounted in the respective wall members 17, 18, 30 and 19 and extending axially relative to the cylindrical main portions of the housing segments 20 and 21. Thus, the shaft 35 is journaled in a ball bearing assembly 36 provided in the wall member 17, in a similar ball bearing assembly 37 provided in the wall member 18, in respective additional ball bearing assemblies 38, 38 provided at the opposite sides of the wall member 30, and in a final ball bearing assembly 39 provided in the end wall member 19, the shaft being reduced in diameter adjacent the end wall 19, as shown at 40, defining an annular retaining shoulder 41 adjacent the inside surface of wall member 19, the reduced portion 40 extending through the wall member 19 and being supported by the ball bearing assembly 39.

The wall members 17 and 18 are formed with opposing parallel annular grooves 42 and 43 located eccentrically relative to the shaft 35, and rotatably supported in said grooves is a generally cylindrical sleeve valve member 44 whose lower portion is rotatably and sealingly received in a downwardly bulged, longitudinally extending bottom extension 46 of housing segment 20. The opposite ends of the sleeve member 44 make rotating sealing contact in the grooves 43 and 42, and the sleeve member 44 is formed with a longitudinally extending wide slot 47 extending through the major portion of the length of the sleeve member, the transverse end edges of the slot being substantially flush with the inside surfaces of the transverse walls 17 and 18. The slot 47 subtends an angle of the order of 80° relative to the axis of the cylindrical sleeve member 44 and has inwardly convexly curved longitudinal edges 48 and 49. Secured on the shaft 35 is a blower vane assembly, designated generally at 50, comprising a sleeve portion 51 surrounding the shaft 35 and slidably keyed thereto, said sleeve portion extending for almost the full internal longitudinal length of the compression chamber defined between the walls 17 and 18. Formed integrally with the sleeve 51 and extending substantially tangentially thereof is a flange member 52, coextensive in length with the sleeve and formed at one end with the thickened triangular portion 53 having the inclined inwardly facing shoulder portion 54. Receiving and secured to the flange 52 is an adjustable vane member 55, of U-shaped cross section, the top wall 56 of said vane member (as viewed in FIGURE 14), being formed with a triangular notch to receive the triangular shoulder member 53, and the vane member being adjustable in a direction parallel to the shoulder edge 54. Thus, the bottom wall of the vane member 55 is formed with an upstanding rib 57 extending parallel to the shoulder edge 54 which is received in a slot 58 formed in the flange 52, said slot being also parallel to edge 54. The flange 52 is further formed with ribs or serrations 59 extending parallel to edge 54, said ribs or serrations being slidably received in mating grooves or recesses provided in the bottom surface of the top wall 56 of the vane member 55. The vane member 55 may be loosely secured relative to the flange 52 by the provision of a clamping screw 60 engaged through the top wall 56 of the vane member 55 and threadedly engaged in the rib 57. When the screw 60 is tightened, the top wall 56 is flexed sufficiently to exert loose clamping force on the flange 52, whereby to yieldably secure the vane member 55 to said flange 52.

As shown in FIGURES 5, 7 and 9, the tangentially extending vane portion of the assembly 50 extends through the aperture 47, the outer edge 62, comprising the bight portion of the member 55 being in sliding sealing contact with the inside surface of the housing segment 20.

As shown in FIGURES 1, 5, 7 and 9, the compressor housing segment 20 is provided with a further bulged portion 64 extending longitudinally thereof at the side opposite the bulged portion 46 and being offset outwardly, the bulged portion 64 merging with a downwardly extending substantially semi-cylindrical longitudinally extending bottom tunnel or housing 65 having a cylindrical inner bore 66. A longitudinally extending arcuate plate member 67 is supported in sealing and braking contact conformably with the bottom portion of the sleeve 44, as by a plurality of radially extending pins 68 projecting therefrom and slidably engaged through apertures provided in bulged wall portion 64. Biasing springs 68' are provided on pins 68 between wall portion 64 and plate 67, whereby plate 67 is urged into frictional engagement with the sleeve 44 and forms an arcuate continuation of the inside surface of the bulged wall portion 46. Thus, a passage 69 is defined connecting the interior of the housing segment 20 with the bore 66, as shown in FIGURES 5, 7 and 9. Furthermore, the compressed gas in the space shown at 71 exerts pressure against the plate 67, which acts as a brake on sleeve 44, and prevents uncontrolled rotation of said sleeve.

A fuel mixture supply conduit 70 is connected to the lower portion of the end wall 17, being in communication with the interior of the sleeve 44, as shown in FIGURES 1, 5, 7 and 9, the supply conduit 70 leading from a suitable source of fuel mixture, for example, a combustible hydrocarbon fuel and air mixture. In the position of the vane assembly 50 illustrated in FIGURE 5, the fuel mixture is admitted freely into all portions of the space inside the housing segment 20 except for the compression space 71, defined between the vane assembly 50 and the sealing plate 67. This space 71 contains compressed fuel mixture which is delivered to the bore 66 and thence to one of the combustion cylinders, as will be presently explained. Thus, the vane position of FIGURE 5 represents the intake position relative to said one of the combustion cylinders. It will be apparent that the vane assembly 50 drives the sleeve 44 in the direction of rotation of shaft 35, namely, in a clockwise direction, as viewed in FIGURE 5. In the position shown in FIGURE 7, the vane assembly 50 has driven the sleeve 44 to a position such that the aperture 47 is completely sealed by the bulged wall portion 46 and the sealing plate 67. Pressure relief is provided for the gaseous material trapped between the vane assembly 50 and the upper left portion of the sleeve 54, as viewed in FIGURE 7, by the provision of a plurality of small bypass passages 74 formed in each wall 17 and 18 around the grooves 42 and 43. These relief passages 74 allow unimpeded continuation of the rotation of the vane assembly from the position of FIGURE 7 to the position of FIGURE 9. The position of FIGURE 7 corresponds to the beginning of the power and exhaust portion of the cycle of one of the combustion cylinders, as will be presently explained.

Continued rotation of the vane assembly 50 in a clockwise direction from the position of FIGURE 7 to the position of FIGURE 9 exposes the aperture 47 to the left portion of the housing segment 20, as viewed in FIGURE 9, allowing fuel mixture to enter said portion from the interior of sleeve 44, while allowing the vane assembly 50 to begin the compression of fuel mixture contained in the portion of housing segment 20 to the right thereof, as viewed in FIGURE 9, namely, the portion contained in the space 71. As will be presently explained, this position of the vane assembly 50 occurs at the beginning of the scavenging portion of the cycle of one of the combustion cylinders.

As will be presently explained, the combustion cylinders operate alternately and the same cycle of operation of the compressor portion of the engine takes place for each alternate operation of the combustion cylinders.

The lower portion of the housing segment 21 is formed with a longitudinally extending tunnel 75 having a cylindrical bore 76 aligned with the bore 66 and containing a rotary valve sleeve 77 formed integrally with an actuating shaft 78. The shaft 78 is rotatably supported in a longitudinal bore 79 and is further supported in a ball bearing assembly 80 provided in the transverse end wall 19, the shaft being provided at its outer end with the relatively large driven sprocket wheel 81. This sprocket wheel is drivingly coupled by a sprocket chain 82 to a drive sprocket 83 secured on the reduced main shaft portion 40, the sprocket wheels 83 and 81 being in one-to-two ratio so that the shaft 78 is driven at one-half the speed of the shaft element 40.

The valve sleeve 77 is formed with a pair of diametrically opposed discharge slots 84 and 85 respectively subtending angles of between 40 and 45 degrees on the circumferential periphery of the sleeve 77 and being registrable respectively with the lower ends of fuel admission passages 86 and 87 formed in transverse wall 30 and leading respectively to the combustion chambers 31 and 32. Because of the one-to-two ratio between the drive sprocket 83 and the driven sprocket 81, the interior of the sleeve 77 is communicatively connected alternately to the combustion spaces 31 and 32, and this communication occurs at a position of blower vane assembly 50 corresponding to that shown in FIGURE 5.

As shown in FIGURE 3, the lower ends of the passages 86 and 87 are spaced longitudinally along the sleeve 77, and the slots 84 and 85 are similarly spaced so as to be registrable with said lower ends. When the slots 84 and 85 respectively register with the lower ends of the passages 86 and 87, as above explained, compressed fuel mixture is admitted into the associated combustion cylinder 31 or 32 by the action of the compressor vane assembly 50, which travels substantially from the position of FIGURE 5 toward the position of FIGURE 7 during this interval, forcing the compressed fuel mixture into the sleeve of the combustion cylinder and thus cutting off communication with the fuel mixture supply conduit 70 by the closure of the aperture 47 of valve sleeve 44 as it reaches the sealing position of FIGURE 7. Simultaneously with the rotation of the sleeve 44 to the position of FIGURE 7, the associated slot 84 or 85 moves out of registry with the lower end of the corresponding passage 86 or 87.

As shown in FIGURE 3, the respective combustion chambers 31 and 32 are defined on the opposite sides of the transverse wall member 30. The combustion cylinders and their contents are of identical construction, although, as previously mentioned, they operate in alternating sequence. Thus, the combustion cylinder containing the combustion chamber 32 at the right side of the partition wall 30 in FIGURE 3 is provided with a substantially cylindrical inner wall 87' arranged coaxially with shaft 35 and spaced inwardly from the outer main housing segment 21 to define an air cooling jacket 88. The substantially cylindrical wall 87' is rigidly secured between the transverse walls 30 and 19 and has a longitudinal bottom edge 89 located adjacent to and inwardly of an arcuate bottom wall portion 90 concentric with the shaft 35 but of smaller radius than the main housing segment 21 and merging with the main housing segment at a location a short distance rightward of the edge 89, as shown at 91 in FIGURE 6. An air inlet conduit 92 is formed integrally with the main housing elements 21 and 90 and communicates with the air flow space 93 inwardly adjacent arcuate wall element 90. An air discharge conduit 94 is likewise formed integrally with the main housing segment 21 and communicates with the discharge end of the air jacket 88, as shown in FIGURE 6. Between the conduits 92 and 94 the main housing 21 is formed integrally with an exhaust conduit 95 which is in communication with the interior space 96 in the cylindrical chamber 87'.

Figure 2:
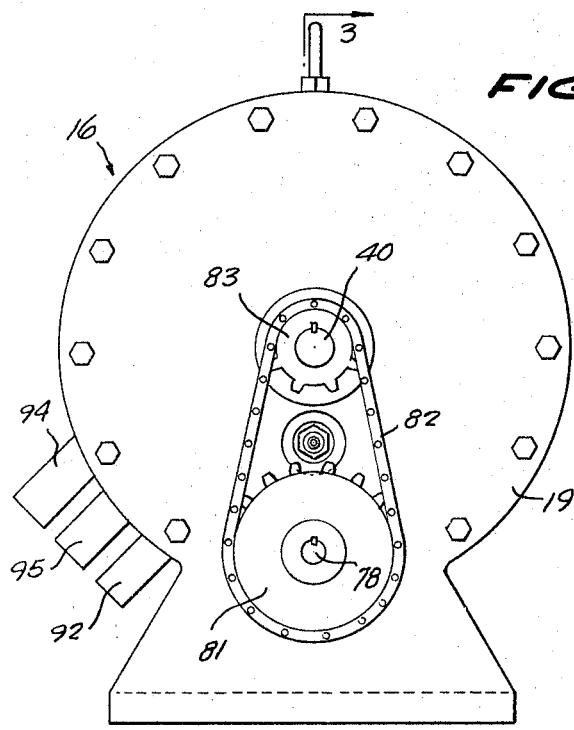
FIGURE 2 is an end elevational view of the engine of FIGURE 1.
Figure 13:
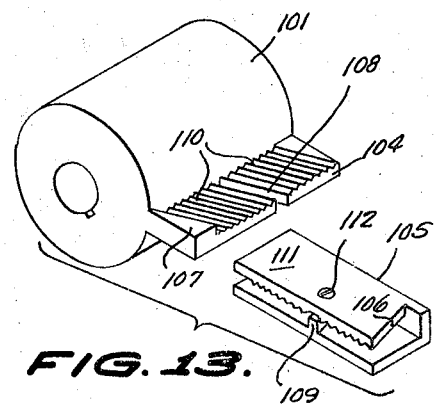
FIGURE 13 is a perspective view showing the parts of the rotary piston of FIGURE 12 in separated positions.
Figure 11:
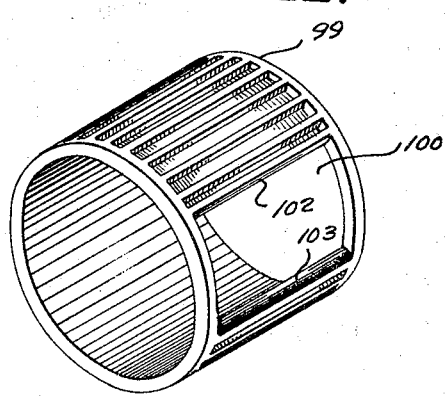
FIGURE 11 is a perspective view of the rotary compressor sleeve employed in one of the combustion cylinders of the engine illustrated in FIGURES 1 to 10.

The walls 19 and 30 are formed with opposing annular grooves 97 and 98 which are parallel but which are eccentric relative to the shaft 35, as is clearly shown in FIGURE 3, and rotatably mounted in the pair of opposing grooves 97 and 98 is a generally cylindrical sleeve member 99. The sleeve member is formed with a large aperture 100 extending substantially for the entire distance between the planes of the inside surfaces of walls 19 and 30 and subtending an angle of approximately 50°, the longitudinal edges of the aperture being convexly inwardly rounded, as shown at 102 and 103 in FIGURE 11. Slidably keyed on shaft 35 inside the sleeve 99 is a cylindrical collar member 101, almost coextensive in axial length with the space defined between the inside surfaces of walls 19 and 30, said collar member being formed with a radially outwardly projecting flange 104. Adjustably secured on the flange 104 is a vane member 105 of generally U-shaped cross section formed with a triangular notch 106 in its top wall, as viewed in FIGURE 2, which slidably receives a triangular shoulder 107 integrally formed on one side margin of flange 104. The flange 104 is formed at its intermediate portion with an inclined slot 108 extending parallel to the inclined inner edge of shoulder 107, said slot 108 receiving a rib 109 formed in the bottom wall of the vane element 105. The flange 104 is similarly formed with parallel serrations 110 which extend parallel to the slot 108 and which slidably interfit with corresponding serrations formed in the bottom surface of top wall 111 of vane element 105. The vane member 105 is yieldably secured in adjusted position relative to the flange 104 by a clamping screw 112 which is engaged through the top wall 111 and is threadedly engaged in the rib 109, the top wall flexing sufficiently when screw 112 is tightened to exert a loose clamping grip on the flange 104.

As shown in FIGURE 6, the vane assembly including the member 105 and the flange 104 bears against the edge 102 of slot 100 when shaft 35 rotates in a counterclockwise direction, as viewed in FIGURE 6, corresponding to the clockwise direction of rotation of said shaft as viewed in FIGURE 5, causing the sleeve 99 to be similarly rotated in the grooves 97 and 98.

The main casing 87' is provided with longitudinally extending outwardly projecting cooling ribs 113, and the rotary sleeve member 99 is similarly provided with longitudinally extending cooling ribs 114. The side edges of the vane assembly comprising flange 104 and vane element 105 are substantially in sliding sealing contact with the inside surfaces of transverse walls 19 and 30.

It will be seen from FIGURES 5 and 6 that the trailing edge 103 of aperture 100 is just about to overlap the edge portion 89 of the stationary casing 87' with the vane assembly 50 in the delivery position shown in FIGURE 5. Immediately thereafter the compressed fuel mixture is supplied to the combustion chamber 32 by the registry of the lower end of passage 87 with slot 85, as above described, so that the compressed fuel mixture is injected into the chamber 32 during this portion of the cycle of operation. The outer edge of the vane element 105 makes sealing sliding contact with the inside surfaces of the casing 87' so that the fuel mixture is confined in the combustion chamber 32. The spark plug 34 is energized a short time after slot 85 moves out of registry relative to the lower end of passage 87, causing the compressed fuel mixture to be ignited, thereby developing a power stroke, driving the vane assembly comprising members 104 and 105 to the position thereof shown in FIGURE 8, wherein the combustion chamber 32 becomes exposed to the main space 96 inside casing 87' rearwardly of the vane assembly 104–105. Exhaust gases from the previous cycle are expelled ahead of the vane assembly through the discharge conduit 95. As shown in FIGURES 7 and 8, the power and exhaust portion of the cycle, above described, occurs substantially with the compressor sleeve aperture 47 sealed off by the elements 46, 67 and with the slot 85 out of registry with the lower end of passage 87.

It will be noted that the air supplied by the conduit 92, which is preferably under substantial pressure, for example, which may be supplied from the output conduit of a blower either independently driven or driven by the engine through suitable driving connections, is supplied through the passage 93 to the cooling jacket 88 and a portion of this air moves into the space 96, providing a scavenging action and aiding the effective removal of the products of combustion. As the vane assembly 104–105 rotates from the position in FIGURE 8 to the position in FIGURE 10, the products of combustion and the scavenging air in the space 96 merge while the combustion space 32 becomes sealed by the movement of aperture 100 past the top of the collar member 101, preparing the combustion chamber 32 for the reception of a new charge of compressed fuel mixture. During the next cycle, the products of combustion of the previous cycle, mixed with scavenging air, are forced out of the space 96 by the counterclockwise rotation of the vane assembly 104–105 from the position of FIGURE 10 through the positions shown in FIGURES 6 and 8.

The transverse walls 19 and 30 are formed adjacent the upper portions of the grooves 97 and 98 with restricted bypass passages 115 to provide relief for the space inside the sleeve member 99 ahead of the vane assembly 104–105 and to prevent interference with the free rotation of the vane assembly by fluid trapped in this space.

As above mentioned, the combustion chambers 31 and 32 operate in alternate relationship, so that after each firing in a combustion chamber there follows a cycle of non-firing, during which the other combustion chamber is active. Thus, after the power stroke, produced by the explosion of the fuel mixture, and resulting in the positioning of the vane assembly 104–105 in the position of FIGURE 8, the vane assembly is driven through the position of FIGURE 10 and then for another full complete revolution, clearing out the products of combustion and scavenging air mixed therewith, until the vane assembly again reaches the position shown in FIGURE 6, subsequent to which it is furnished with a new charge of compressed fuel mixture, and the cycle is repeated.

The structure associated with the combustion chamber 31 is exactly the same as that provided in the combustion chamber 32, except that it operates in alternating relationship with respect to combustion chamber 32, since the admission slot 84 associated with the passage 86 is 180° displaced in phase relative to the admission slot 85.

A suitable distributor, of conventional construction, is provided to supply the properly timed energizations of the respective spark plugs 34 and 33. The spark plugs 34 and 33 are therefore energized in alternating relationship, corresponding to the alternate delivery of compressed fuel mixture to the combustion chambers 32 and 31. The conventional distributor associated with the spark plugs 34 and 33, not shown, may be suitably driven in any conventional manner, for example, by suitable drive means connected to the shaft 35.

The engine is provided with suitable means for lubricating the shaft 35 and its reduced portion 40. Thus, respective lubricating passages 111', 112', 113' and 114' are provided in the respective transverse wall members 17, 18, 30 and 19, said passages leading to the bores through which shaft 35 and reduced shaft portion 40 pass, said bores having sufficient clearance to allow lubricant supplied through said passages to flow to the respective ball bearing assemblies 36, 37, 38 and 39. Lubricant is supplied to said passages from an oil supply line 115' having respective branches 116, 117, 118 and 119 connected to the respective lubricant passages.

The engine of the present invention has the advantage that the compression ratio can be raised to a value of 10:1 and even higher by means of a simple modification, namely, employing a gasoline injector on the engine instead of a carburetor. The injector is mounted parallel to the shaft 35 and is operated by the latter by means of suitable gearing coupling the injector to shaft 35. Since the injection passages 86, 87 discharge directly into the combustion spaces 31, 32, the compression cylinder can have a volumetric content much greater relative to that of the combustion spaces than it is possible to achieve with conventional piston engines. The advantages of higher compression ratios are well known to those skilled in the art.

The engine can be easily advantageously applied to motorcycles (from 10 to 30 H.P. approximately) by making the engine in the form of a flattened drum, namely, by decreasing the length of the engine and increasing its diameter, and then assembling it, in the center of the rear wheel on its own shaft or on the wheel shaft. In this form, cooling of the engine is facilitated by providing cooling ribs on the end walls of the engine. Said cooling will be exposed to air adjacent the engine, and because of the rapid movement of the motorcycle, said cooling ribs will provide a sufficient cooling action to eliminate the necessity for the internal cooling means described above, so that said internal cooling means may be omitted, if so desired.

In conventional piston engines, piston rings are employed on the pistons to provide self-adjusting seal contact with the cylinder walls. The self-adjusting vanes employed in the engine of the present invention operate to perform the same results as piston rings, but are actuated by centrifugal force, whereby their sealing action is derived by centrifugal force acting on the adjustable vane elements to urge them outwardly into sealing engagement with the cylinder walls responsive to the rapid rotation of the vane assemblies. The inclined edges of shoulders 53 and 107 exert a camming action on the adjacent edges of the adjustable vane elements 62 and 105 urging the vane elements lengthwise relative to the vane bodies on which they are slidably mounted, in effect, expanding the vanes lengthwise responsive to rotation thereof and improving the seal between the ends of the vanes and the end walls of the cylinder chambers in which they rotate. The vane bodies are keyed to shaft 35, but are slidable longitudinally sufficiently to allow them to cooperate cammingly with the adjustable vane elements in the manner above described to expand the vane assemblies longitudinally responsive to rotation thereof because of the axial thrust effects provided by the centrifugal force. Thus, the adjustable elements of the vane assemblies cooperate with their associated vane bodies to provide effective sealing contact between the various edge portions of the vane assemblies and the adjacent inside surface portions of their associated working chambers.

In the modification of the invention illustrated in FIGURES 16 to 19, the spark plug 33' associated with the chamber 31 is mounted in a recess 200 provided in the intermediate wall, shown at 30' and is arranged in the manner illustrated in FIGURES 17 and 18, namely, with its electrodes exposed to a passage 201 leading into chamber 31. Spark plug 33' is substantially at the same relative location with respect to chamber 31 as is spark plug 34 with respect to chamber 32.

The bore 66 communicates with an aperture 204' in member 18 and with a bore 203 formed in a bottom tunnel member 75' provided on housing segment 21. Bore 203 communicates with the open end of a cylindrical cup member 204 rotatably and sealingly mounted in the end of tunnel member 75'. Cup member 204 is axially secured at its end wall to one end of an external longitudinal shaft member 78' which is journaled in a bearing unit 80 provided in member 19. The sprocket wheel 81 is mounted on the outer end of shaft 78' and is coupled to sprocket wheel 83 by the sprocket chain 82, as previously described. The sprocket wheels 83 and 81 are in one-to-two ratio so that the shaft 78' is driven at one-half the speed of the shaft element 40.

The cylindrical cup member 204 is provided with slots 84 and 85 located so as to be registerable with the lower ends of passages 86 and 87 in the manner previously described. When the slots 84 and 85, respectively, register with the lower ends of the passages 86 and 87, compressed fuel mixture is injected into the associated combustion cylinder 31 or 32 by the action of the compressor vane assembly 50.

While certain embodiments of an improved rotary internal combustion engine have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A rotary internal combustion engine comprising a compression cylinder and a combustion cylinder arranged in axial alignment, a transverse wall separating the cylinders, a common rotary shaft extending axially through the length of said cylinders, a compression vane mounted on said shaft within the compression cylinder and having an outer edge disposed adjacent the inner surface of the compression cylinder, a combustion vane mounted on said shaft within the combustion cylinder and having an outer edge disposed adjacent the inner surface of the combustion cylinder, said vanes extending substantially through the entire axial length of their respective cylinders, a hollow cylindrical sleeve rotatably mounted within the compression cylinder adjacent a portion of the interior surface thereof on an axis eccentric to the axis of the shaft and having an aperture therein receiving the compression vane, fuel mixture supply means connected to the compression cylinder, a hollow cylindrical sleeve rotatably mounted in the combustion cylinder on an axis eccentric to the axis of the shaft and having an aperture receiving said combustion vane, ignition means in the combustion cylinder within said last-named sleeve, conduit means extending parallel to the axis of said shaft in the longitudinal wall of the compression cylinder extending lengthwise thereof and extending lengthwise in the longitudinal wall of the combustion cylinder, said conduit means communicating with the compression cylinder to receive compressed fuel mixture therefrom, said combustion cylinder having a transverse wall formed with a passage in communication with said conduit means and leading to the space in the combustion cylinder within said last-named sleeve, said conduit means including a rotary sleeve valve coaxially-mounted therein and located adjacent the combustion cylinder, said sleeve valve being apertured to register with said passage, means drivingly coupling said sleeve valve to said shaft to periodically register its aperture with said passage responsive to rotation of the shaft, an air cooling jacket surrounding said combustion cylinder, and means to circulate cooling air simultaneously through said air cooling jacket and around said second-named sleeve.

2. A rotary internal combustion engine comprising a compression cylinder and combustion cylinder arranged in axial alignment, a transverse wall separating the cylinders, a common rotary shaft extending axially through the length of said cylinders, a compression vane mounted on said shaft within the compression cylinder and having an outer edge disposed adjacent the inner surface of the compression cylinder, a combustion vane mounted on said shaft within the combustion cylinder and having an outer edge disposed adjacent the inner surface of the combustion cylinder, said vanes extending substantially through the entire axial length of their respective cylinders, a hollow cylindrical sleeve rotatably mounted within the compression cylinder adjacent a portion of the interior surface thereof on an axis eccentric to the axis of the shaft and having an aperture therein receiving the compression vane, fuel mixture supply means connected to the compression cylinder, a hollow cylindrical sleeve rotatably mounted in the combustion cylinder on an axis eccentric to the axis of the shaft and having an aperture receiving said combustion vane, ignition means in the combustion cylinder within said last-named sleeve, conduit means extending parallel to the axis of said shaft in the longitudinal wall of the compression cylinder extending lengthwise thereof and extending lengthwise in the longitudinal wall of the combustion cylinder, said conduit means communicating with the compression cylinder to receive compressed fuel mixture therefrom, said combustion cylinder having a transverse wall formed with a passage in communication with said conduit means and leading to the space in the combustion cylinder within said last-named sleeve, said conduit means including a rotary sleeve valve coaxially-mounted therein and located adjacent the combustion cylinder, said sleeve valve being apertured to register with said passage, means drivingly coupling said sleeve valve to said shaft to periodically register its aperture with said passage responsive to rotation of the shaft, an exhaust conduit connected to said combustion cylinder, an air cooling jacket surrounding said combustion cylinder and terminating at opposite sides of said exhaust conduit, and means to admit cooling air under pressure into one end of the cooling jacket and simultaneously into the space in said combustion cylinder adjacent said second-named sleeve.

3. A rotary internal combustion engine comprising a compression cylinder and a combustion cylinder arranged in axial alignment, a transverse wall separating the cylinders, a common rotary shaft extending axially through the length of said cylinders, a tangentially extending compression vane mounted on said shaft within the compression cylinder and having an outer edge disposed adjacent the inner surface of the compression cylinder, a radially extending combustion vane mounted on said shaft within the combustion cylinder and having an outer edge disposed adjacent the inner surface of the combustion cylinder, said vanes extending substantially through the entire axial length of their respective cylinders, a hollow cylindrical sleeve rotatably mounted within the compression cylinder adjacent a portion of the interior surface thereof on an axis eccentric to the axis of the shaft and having an aperture therein receiving the compression vane, fuel mixture supply means connected to the compression cylinder, a hollow cylindrical sleeve rotatably mounted in the combustion cylinder on an axis eccentric to the axis of the shaft and having an aperture receiving said combustion vane, ignition means in the combustion cylinder within said last-named sleeve, conduit means extending parallel to the axis of said shaft in the longitudinal wall of the compression cylinder extending lengthwise thereof and extending lengthwise in the longitudinal wall of the combustion cylinder, said conduit means communicating with the compression cylinder to receive compressed fuel mixture therefrom, said combustion cylinder having a transverse wall formed with a passage in communication with said conduit means and leading to the space in the combustion chamber within said last-named sleeve, said conduit means including a rotary sleeve valve coaxially-mounted therein and located adjacent the combustion cylinder, said sleeve valve being apertured to register with said passage, means drivingly coupling said sleeve valve to said shaft to periodically register its aperture with said passage responsive to rotation of the shaft, an exhaust conduit connected to said combustion cylinder, an air cooling jacket surounding said combustion cylinder and terminating at opposite sides of said exhaust conduit, and means to admit cooling air under pressure into one end of the cooling jacket and simultaneously into the space in said combustion cylinder adjacent said second-named sleeve.

4. A rotary internal combustion engine comprising a compression cylinder and a combustion cylinder arranged in axial alignment, a transverse wall separating the cylinders, a common rotary shaft extending axially through the length of said cylinders, a compression vane mounted on said shaft within the compression cylinder and having an outer edge disposed adjacent the inner surface of the compression cylinder, a combustion vane mounted on said shaft within the combustion cylinder and having an outer edge disposed adjacent the inner surface of the combustion cylinder, said vanes extending substantially through the entire axial length of their respective cylinders, a hollow cylindrical sleeve rotatably mounted within the compression cylinder adjacent a portion of the interior surface thereof on an axis eccentric to the axis of the shaft and having an aperture therein receiving the compression vane, fuel mixture supply means connected to the compression cylinder, a hollow cylindrical sleeve rotatably mounted in the combustion chamber on an axis eccentric to the axis of the shaft and having an aperture receiving said combustion vane, ignition means in the combustion cylinder within said last-named sleeve, conduit means extending parallel to the axis of said shaft in the longitudinal wall of the compression cylinder extending lengthwise thereof and extending lengthwise in the longitudinal wall of the combustion cylinder, said conduit means communicating with the compression cylinder to receive compressed fuel mixture therefrom, said combustion cylinder having a transverse wall formed with a passage in communication with said conduit means and leading to the space in the combustion cylinder within said last-named sleeve, said conduit means including a rotary sleeve valve coaxially-mounted therein and located adjacent the combustion cylinder, said sleeve valve being apertured to register with said passage, means drivingly coupling said sleeve valve to said shaft to register its aperture with said passage once for every second revolution of said shaft, an air cooling jacket circumferentially surrounding said combustion cylinder, and means to circulate cooling air simultaneously through said air cooling jacket and around said last-named sleeve.

5. A rotary internal combustion engine comprising a compression cylinder and a combustion cylinder arranged in axial alignment, a transverse wall separating the cylinders, a common rotary shaft extending axially through the length of said cylinders, a tangentially extending compression vane mounted on said shaft within the compression cylinder and having an outer edge disposed adjacent the inner surface of the compression cylinder, a radially extending combustion vane mounted on said shaft within the combustion cylinder and having an outer edge disposed adjacent the inner surface of the combustion cylinder, said vanes extending substantially through the entire axial length of their respective cylinders, a hollow cylindrical sleeve rotatably mounted within the compression cylinder adjacent a portion of the interior surface thereof on an axis eccentric to the axis of the shaft and having an aperture therein receiving the compression vane, fuel mixture supply means connected to the compression cylinder, a hollow cylindrical sleeve rotatably mounted in the combustion cylinder on an axis eccentric to the axis of the shaft and having an aperture receiving said combustion vane, ignition means in the combustion cylinder within said last-named sleeve, conduit means extending parallel to the axis of said shaft in the longitudinal wall of the compression cylinder extending lengthwise thereof and extending lengthwise in the longitudinal wall of the combustion cylinder, said conduit means communicating with the compression cylinder to receive compressed fuel mixture therefrom, said combustion cylinder having a transverse wall formed with a passage in communication with said conduit means and leading to the space in the combustion cylinder within said last-named sleeve, said conduit means including a rotary sleeve valve coaxially-mounted therein and located adjacent the combustion cylinder, said sleeve valve being apertured to register with said passage, means drivingly coupling said sleeve valve to said shaft to register its aperture with said passage once for each second revolution of said shaft, an exhaust conduit connected to said combustion cylinder, an air cooling jacket circumferentially surrounding said combustion cylinder and terminating at opposite sides of said exhaust conduit, and means to admit cooling air under pressure into one end of the cooling jacket and simultaneously into the space in said combustion cylinder adjacent said second-named sleeve.

6. A rotary internal combustion engine comprising a compression cylinder and a combustion cylinder arranged in axial alignment, a transverse wall separating the cylinders, a common rotary shaft extending axially through the length of said cylinders, a tangentially extending compression vane mounted on said shaft within the compression cylinder and having an outer edge disposed adjacent the inner surface of the compression cylinder, a radially extending combustion vane mounted on said shaft within the combustion cylinder and having an outer edge disposed adjacent the inner surface of the combustion cylinder, said vanes extending substantially through the entire axial length of their respective cylinders, a hollow cylindrical sleeve rotatably mounted within the compression cylinder adjacent a portion of the interior surface thereof on an axis eccentric to the axis of the shaft and having an aperture therein receiving the compression vane, fuel mixture supply means connected to the compression cylinder, a hollow cylindrical sleeve rotatably mounted in the combustion cylinder on an axis eccentric to the axis of the shaft and having an aperture therein receiving said combustion vane, the walls of the cylinders adjacent the ends of the hollow cylindrical sleeves being formed with restricted relief passages connecting the spaces on opposite sides of the ends of the sleeves, ignition means in the combustion cylinder within said last-named sleeve, conduit means extending parallel to the axis of said shaft in the longitudinal wall of the compression cylinder extending lengthwise thereof and extending lengthwise in the longitudinal wall of the combustion cylinder, said conduit means communicating with the compression cylinder to receive compressed fuel mixture therefrom, said combustion cylinder having a transverse wall formed with a passage in communication with said conduit means and leading to the space in the combustion cylinder within said last-named sleeve, said conduit means including a rotary sleeve valve coaxially mounted therein and located adjacent the combustion cylinder, said sleeve valve being apertured to register with said passage, means drivingly coupling said sleeve valve to said shaft to register its aperture with said passage once every second revolution of said shaft, an exhaust conduit connected to said combustion cylinder, an air cooling jacket circumferentially surrounding said combustion cylinder and terminating at opposite sides of said exhaust conduit, and means to admit cooling air under pressure into one end of the cooling jacket and simultaneously into the space in said combustion cylinder adjacent said second-named sleeve.

7. A rotary internal combustion engine comprising a compression cylinder and a combustion cylinder arranged in axial alignment, a transverse wall separating the cylinders, a common rotary shaft extending axially through the length of said cylinders, a compression vane mounted on said shaft within the compression cylinder and having an outer edge disposed adjacent the inner surface of the compression cylinder, a combustion vane mounted on said shaft within the combustion cylinder and having an outer edge disposed adjacent the inner surface of the combustion cylinder, said vanes extending substantially through the entire axial length of their respective cylinders, fuel mixture supply means connected to the compression cylinder, a hollow cylindrical sleeve rotatably mounted in the combustion cylinder on an axis eccentric to the axis of its shaft and having an aperture receiving said combustion vane, ignition means in the combustion cylinder within said last-named sleeve, conduit means in the longitudinal wall of the compression cylinder extending lengthwise thereof and extending lengthwise in the longitudinal wall of the combustion cylinder, said conduit means communicating with the compression cylinder to receive compressed fuel mixture therefrom, a timing valve in said conduit means located adjacent said combustion chamber to control communication between the conduit means and the combustion chamber, means to open said timing valve periodically responsive to rotation to the shaft, an air cooling jacket circumferentially surrounding said combustion cylinder, and means to circulate cooling air simultaneously through said air cooling jacket and around said last-named sleeve.

8. A rotary internal combustion engine comprising a compression cylinder and a combustion cylinder arranged in axial alignment, a transverse wall separating the cylinders, a common rotary shaft extending axially through the length of said cylinders, a compression vane mounted on said shaft within the compression cylinder and having an outer edge disposed adjacent the inner surface of the compression cylinder, a combustion vane mounted on said shaft within the combustion cylinder and having an outer edge disposed adjacent the inner surface of the combustion cylinder, said vanes extending substantially through the entire axial length of their respective cylinders, a hollow cylindrical sleeve rotatably mounted within the compression cylinder adjacent a portion of the interior surface thereof on an axis eccentric to the axis of the shaft and having an aperture therein receiving the compression vane, a fuel mixture supply conduit connected to the compression cylinder, a hollow cylindrical sleeve rotatably monuted in the combustion cylinder on an axis eccentric to the axis of the shaft and having an aperture receiving said combustion vane, ignition means in the combustion cylinder within said last-named sleeve, conduit means in the longitudinal wall of the compression cylinder extending lengthwise thereof and extending lengthwise in the longitudinal wall of the combustion cylinder, said conduit means communicating with the compression cylinder to receive compressed fuel mixture therefrom, a timing valve in said conduit means located adjacent said combustion chamber to control communication between the conduit means and the combustion chamber, means to open said timing valve periodically responsive to rotation of the shaft, an air cooling jacket circumferentially surrounding said combustion cylinder, and means to circulate cooling air simultaneously through said air cooling jacket and around said last-named sleeve.

9. A rotary internal combustion engine comprising a compression cylinder and a combustion cylinder arranged in axial alignment, a transverse wall separating the cylinders, a common rotary shaft extending axially through the length of said cylinders, a compression vane mounted on said shaft within the compression cylinder and having an outer edge disposed adjacent the inner surface of the compression cylinder, a combustion vane mounted on said shaft within the combustion cylinder and having an outer edge disposed adjacent the inner surface of the combustion cylinder, said vanes extending substantially through the entire axial length of their respective cylinders, a hollow cylindrical sleeve rotatably mounted within the compression cylinder adjacent a portion of the interior surface thereof on an axis eccentric to the axis of the shaft and having an aperture therein receiving the compression vane, a fuel mixture supply conduit connected to the compression cylinder, a hollow cylindrical sleeve rotatably mounted in the combustion cylinder on an axis eccentric to the axis of the shaft and having an aperture receiving said combustion vane, ignition means in the combustion cylinder within said last-named sleeve, conduit means in the longitudinal wall of the compression cylinder extending lengthwise thereof and extending lengthwise in the longitudinal wall of the combustion cylinder, said conduit means communicating with the compression cylinder to receive compressed fuel mixture therefrom, a timing valve in said conduit means located adjacent said combustion chamber to control communication between the conduit means and the combustion chamber, means to open said timing valve periodically responsive to rotation of the shaft, an exhaust conduit connected to said combustion cylinder, an air cooling jacket surrounding said combustion cylinder and terminating at opposite sides of said exhaust conduit, and means to admit cooling air under pressure into one end of the cooling jacket and simultaneously into the space in said combustion cylinder adjacent said second-named sleeve.

10. A rotary internal combustion engine comprising a compression cylinder and a combustion cylinder arranged in axial alignment, a transverse wall separating the cylinders, a common rotary shaft extending axially through the length of said cylinders, a compression vane assembly mounted on said shaft within the compression cylinder, a combustion vane assembly mounted on said shaft, said vane assemblies extending substantially through the entire axial length of their respective cylinders, at least one of said vane assemblies comprising a vane body keyed to and slidable longitudinally on the shaft, an outwardly-movable sealing element mounted on said vane body engageable with the inside surface of its associated cylinder by centrifugal force responsive to rotation of said shaft, and cooperating inclined cam means on the vane body and the sealing element to develop a longitudinal reactive force on the vane body, moving said vane body longitudinally on the shaft in one axial direction and the sealing element longitudinally in the opposite axial direction, responsive to outward movement of the sealing element, whereby to expand the vane assembly longitudinally, a hollow cylindrical sleeve rotatably mounted within the compression chamber on an axis eccentric to the axis of the shaft and having an aperture therein receiving the compression vane assembly, fuel mixture supply means connected to the compression cylinder, a hollow cylindrical sleeve rotatably mounted in the combustion cylinder on an axis eccentric to the axis of the shaft and having an aperture receiving said combustion vane assembly, ignition means in the combustion cylinder within said last-named sleeve, conduit means in the longitudinal wall of the compression cylinder extending lengthwise thereof and extending lengthwise in the longitudinal wall of the combustion cylinder, said conduit means communicating with the compression cylinder to receive compressed fuel mixture therefrom, a rotary valve in said conduit means located adjacent said combustion chamber to control communication between the conduit means and the combustion chamber, and means drivingly coupling said rotary valve to said shaft to open same periodically responsive to rotation of the shaft.

11. A rotary internal combustion engine comprising a compression cylinder and a combustion cylinder arranged in axial alignment, a transverse wall separating the cylinders, a common rotary shaft extending axially through the length of said cylinders, a compression vane assembly mounted on said shaft within the compression cylinder, a combustion vane assembly mounted on said shaft, said vane assemblies extending substantially through the entire axial length of their respective cylinders, a hollow cylindrical sleeve rotatably mounted within the compression chamber on an axis eccentric to the axis of the shaft and having an aperture therein receiving the compression vane assembly, fuel mixture supply means connected to the compression cylinder, a hollow cylindrical sleeve rotatably mounted in the combustion cylinder on an axis eccentric to the axis of the shaft and having an aperture receiving said combustion vane assembly, ignition means in the combustion cylinder within said last-named sleeve, conduit means in the longitudinal wall of the compression cylinder extending lengthwise thereof and extending lengthwise in the longitudinal wall of the combustion cylinder, said conduit means communicating with the compression cylinder to receive compressed fuel mixture therefrom, a rotary valve in said conduit means located adjacent combustion chamber to control communication between the conduit means and the combustion chamber, means drivingly coupling said rotary valve to said shaft to open same periodically responsive to rotation of the shaft, an arcuate plate member located in said compression cylinder adjacent said conduit means and conformably engaging the periphery of said first-named hollow cylindrical sleeve, and means urging said plate member into frictional braking engagement with said first-named sleeve.

12. A rotary internal combustion engine comprising a compression cylinder and a combustion cylinder arranged in axial alignment, a transverse wall separating the cylinders, a common rotary shaft extending axially through the length of said cylinders, a compression vane assembly mounted on said shaft within the compression cylinder, a combustion vane assembly mounted on said shaft, said vane assemblies extending substantially through the entire axial length of their respective cylinders, at least one of said vane assemblies comprising a vane body keyed to and slidable longitudinally on the shaft, an outwardly-movable sealing element mounted on said vane body engageable with the inside surface of its associated cylinder by centrifugal force responsive to rotation of said shaft, and cooperating inclined cam means on the vane body and the sealing element developing a longitudinal reactive force on the vane body which moves said vane body longitudinally on the shaft in one axial direction and the sealing element longitudinally in the opposite axial direction responsive to outward movement of the sealing element, whereby to expand the vane assembly longitudinally, a hollow cylindrical sleeve rotatably mounted within the compression chamber on an axis eccentric to the axis of the shaft and having an aperture therein receiving the compression vane assembly, fuel mixture supply means connected to the compression cylinder, a hollow cylindrical sleeve rotatably mounted in the combustion cylinder on an axis eccentric to the axis of the shaft and having an aperture receiving said combustion vane assembly, ignition means in the combustion cylinder within said last-named sleeve, conduit means in the longitudinal wall of the compression cylinder extending lengthwise thereof and extending lengthwise in the longitudinal wall of the combustion cylinder, said conduit means communicating with the compression cylinder to receive compressed fuel mixture therefrom, a rotary valve in said conduit means located adjacent said combustion chamber to control communication between the conduit means and the combustion chamber, means drivingly coupling said rotary valve to said shaft to open same periodically responsive to rotation of the shaft, an arcuate plate member located in said compression cylinder adjacent said conduit means and conformably engaging the periphery of said first-named hollow cylindrical sleeve, and spring means urging said plate member into frictional braking engagement with said first-named sleeve.

References Cited by the Examiner
UNITED STATES PATENTS

| | | | |
|---|---|---|---|
| 687,170 | 11/1901 | Stilson | 103—144 |
| 1,147,428 | 7/1915 | Peterson. | |
| 1,531,470 | 3/1925 | Wilson. | |
| 1,670,953 | 5/1928 | Browne. | |
| 2,530,925 | 11/1950 | Udelman | 103—144 |
| 2,969,049 | 1/1961 | Dillenberg. | |
| 3,023,742 | 3/1962 | Udelman | 123—16 X |
| 3,134,370 | 5/1964 | Schlor. | |

MARK NEWMAN, *Primary Examiner.*

CARLTON R. CROYLE, *Examiner.*

F. T. SADLER, *Assistant Examiner.*